United States Patent
Dean et al.

(10) Patent No.: US 9,425,971 B1
(45) Date of Patent: *Aug. 23, 2016

(54) SYSTEM AND METHOD FOR IMPROMPTU SHARED COMMUNICATION SPACES

(75) Inventors: Jeffrey Dean, Palo Alto, CA (US); Georges Harik, Mountain View, CA (US); Obeka Tallis Brown Bakin, Seattle, WA (US)

(73) Assignee: GOOGLE INC., Mountain View, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 13/616,467

(22) Filed: Sep. 14, 2012

Related U.S. Application Data

(63) Continuation of application No. 12/606,998, filed on Oct. 27, 2009, which is a continuation of application No. 11/170,275, filed on Jun. 28, 2005, now Pat. No. 7,610,287.

(51) Int. Cl.
*G06F 17/30* (2006.01)
*H04L 12/18* (2006.01)
*G06F 15/16* (2006.01)

(52) U.S. Cl.
CPC ...... *H04L 12/1818* (2013.01); *G06F 17/30699* (2013.01); *G06F 17/30702* (2013.01); *G06F 17/30867* (2013.01); *Y10S 707/99933* (2013.01); *Y10S 707/99939* (2013.01)

(58) Field of Classification Search
CPC .............. G06Q 50/01; G06F 17/30699; G06F 17/3089; G06F 3/0483
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,446,113 B1 | 9/2002 | Ozzie et al. | |
| 6,697,478 B1 | 2/2004 | Meldrum et al. | |
| 6,745,178 B1 * | 6/2004 | Emens et al. | 707/741 |
| 6,754,322 B1 | 6/2004 | Bushnell | |
| 6,766,374 B2 | 7/2004 | Trovato et al. | |
| 6,950,852 B1 | 9/2005 | Kobayaghi et al. | |

(Continued)

FOREIGN PATENT DOCUMENTS

WO    WO0279984    10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Alex Gofman
(74) *Attorney, Agent, or Firm* — Patent Law Works LLP

(57) ABSTRACT

Communications between entities who may share common interests. For entities determined to be sharing common interests (e.g., searching using the same terms or topics, browsing a page, a site or a groups of topically related sites), options for communication among the entities are provided. For example, a chat room may be dynamically created for persons who are currently searching or browsing the same or related information. As another example, a "homepage" may be created for each query and contain various types of information related to the query. A permission module controls which entities may participate, what types of information (and from what sources) an entity can (or desires to) receive, what types of information the entity may (or desires to) share.

20 Claims, 5 Drawing Sheets

(56) References Cited

U.S. PATENT DOCUMENTS

| | | |
|---|---|---|
| 7,080,139 B1 | 7/2006 | Briggs et al. |
| 7,106,848 B1 | 9/2006 | Barlow et al. |
| 7,366,990 B2 | 4/2008 | Pitroda |
| 7,555,110 B2 | 6/2009 | Dolan et al. |
| 7,610,287 B1 | 10/2009 | Dean et al. |
| 7,613,769 B1 | 11/2009 | Hess |
| 7,669,213 B1 | 2/2010 | Wick et al. |
| 7,707,246 B1 | 4/2010 | Issa et al. |
| 7,742,468 B2 | 6/2010 | Vagelos |
| 7,904,511 B2 | 3/2011 | Ryan et al. |
| 7,970,664 B2 | 6/2011 | Linden et al. |
| 8,015,119 B2 | 9/2011 | Buyukkokten et al. |
| 8,359,206 B2 | 1/2013 | Whalin et al. |
| 8,589,247 B2 | 11/2013 | Mesaros |
| 8,688,143 B2 | 4/2014 | Steenstra et al. |
| 2001/0056465 A1 | 12/2001 | Aiso |
| 2002/0103789 A1 | 8/2002 | Turnbull et al. |
| 2002/0137490 A1 | 9/2002 | Gallant |
| 2002/0143874 A1 | 10/2002 | Marquette et al. |
| 2002/0152101 A1 | 10/2002 | Lawson et al. |
| 2002/0169771 A1 | 11/2002 | Melmon et al. |
| 2003/0021238 A1 | 1/2003 | Corneliussen et al. |
| 2003/0028595 A1 | 2/2003 | Vogt et al. |
| 2003/0033302 A1* | 2/2003 | Banerjee ............... G06Q 10/00 |
| 2003/0225833 A1* | 12/2003 | Pilat et al. ..................... 709/204 |
| 2004/0083263 A1 | 4/2004 | Richardson et al. |
| 2004/0098449 A1 | 5/2004 | Bar-Lavi et al. |
| 2004/0258220 A1 | 12/2004 | Levine et al. |
| 2004/0260701 A1 | 12/2004 | Lehikoinen et al. |
| 2005/0055450 A1 | 3/2005 | Gang |
| 2005/0152521 A1 | 7/2005 | Liljestrand |
| 2005/0154693 A1 | 7/2005 | Ebert |
| 2005/0171799 A1* | 8/2005 | Hull et al. ........................ 705/1 |
| 2006/0004775 A1 | 1/2006 | Kobayashi et al. |
| 2006/0026288 A1 | 2/2006 | Acharya et al. |
| 2006/0063552 A1 | 3/2006 | Tillet et al. |
| 2006/0077957 A1 | 4/2006 | Reddy et al. |
| 2006/0079260 A1 | 4/2006 | Tillet et al. |
| 2006/0080613 A1 | 4/2006 | Savant |
| 2006/0143214 A1* | 6/2006 | Teicher ......................... 707/101 |
| 2006/0173961 A1 | 8/2006 | Turski et al. |
| 2006/0176831 A1 | 8/2006 | Greenberg et al. |
| 2006/0206604 A1 | 9/2006 | O'Neil et al. |
| 2006/0224624 A1 | 10/2006 | Korn et al. |
| 2007/0073810 A1 | 3/2007 | Adams et al. |
| 2007/0127631 A1 | 6/2007 | Difiglia |
| 2007/0171898 A1 | 7/2007 | Salva |
| 2007/0173236 A1 | 7/2007 | Vishwanathan et al. |
| 2007/0204308 A1 | 8/2007 | Nicholas et al. |
| 2007/0248077 A1 | 10/2007 | Mahle, Jr. et al. |
| 2008/0056475 A1 | 3/2008 | Brannick et al. |
| 2008/0192656 A1 | 8/2008 | Vagelos |
| 2009/0044216 A1 | 2/2009 | McNicoll |
| 2010/0017371 A1 | 1/2010 | Whalin et al. |
| 2011/0098156 A1 | 4/2011 | Ng et al. |
| 2011/0289153 A1 | 11/2011 | Hull et al. |
| 2013/0212494 A1 | 8/2013 | Heiferman et al. |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

(56) References Cited

OTHER PUBLICATIONS

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

"Implementing Rich Collaboration Infrastructure Using Microsoft Windows SharePoint Services and Microsoft Office SharePoint Portal Server 2003," White Paper, Microsoft Corporation, Oct. 2003, 14 pgs.

"Deciding When to Deploy Microsoft Windows SharePoint Services and Microsoft Office SharePoint Portal Server 2003," White Paper, Microsoft Corporation, Oct. 2004, 10 pgs.

\* cited by examiner

SYSTEM AND METHOD FOR IMPROMPTU SHARED COMMUNICATION SPACES

CROSS REFERENCE TO RELATED APPLICATIONS

This application is a continuation of and claims priority to U.S. application Ser. No. 12/606,998, filed Oct. 27, 2009, titled "System and Method for Impromptu Shared Communication Spaces," which is a continuation of U.S. Pat. No. 7,610,287, filed Jun. 28, 2005, titled "System and Method for Impromptu Shared Communication Spaces," each of which is incorporated by reference in its entirety.

BACKGROUND

On-line collaboration tools can permit a community of users to collaborate on projects, share information, meet and discuss issues, and make presentations, all on-line. They can be used with various sizes and types of user communities such as work teams, social networks, and other associations of users. However, a particular user community must be defined and set up by an administrator. The administrator determines and defines the membership of the community as well as members' permissions and rights with respect to a collaboration space. Oftentimes, the administrator will need to modify the membership of the community to reflect various changes in the community and/or permissions with respect to the collaboration space. The administrator also configures and maintains the collaboration space itself. In some instances, the rights and responsibilities of an administrator can be delegated to one or more members of the community. Such collaboration spaces, therefore, tend to require more than an insignificant amount of overhead to set up and maintain.

SUMMARY

According to some embodiments, methods and systems for providing communications include identifying a set of users satisfying a first condition and dynamically creating a shared communication space for the set of users. A respective set of communication permissions is identified for each of the users in the set of users with respect to the shared communication space and communication by the set of users is enabled with the shared communications space in accordance with the communication permissions.

BRIEF DESCRIPTION OF THE DRAWINGS

The aspects of the invention as well as features and advantages in addition thereof will be more clearly understood hereinafter as a result of a detailed description of embodiments of the invention when taken in conjunction with the drawings. Like reference numerals refer to corresponding parts throughout the several views of the drawings.

DESCRIPTION OF EMBODIMENTS

According to some embodiments, a set of entities (e.g., including users and/or agents) having a common set of characteristics are identified. The set of common characteristics can include, for example, concurrently doing the same task or related tasks, searching and/or browsing for similar information, messaging on similar topics, composing documents related to similar information, playing related games, and/or having certain profile information. A shared communication space (e.g., a chatroom, web page, or other space) is dynamically created and the entities in the set are invited to participate in the shared communication space. Participation by an entity is governed by a set of communication parameters associated with each user and certain system defined privacy settings. In some embodiments, users can share one or more information items, such as documents, uniform resource locators (URLs), or emails with one or more of the other entities in the shared communication space.

Figure 1:
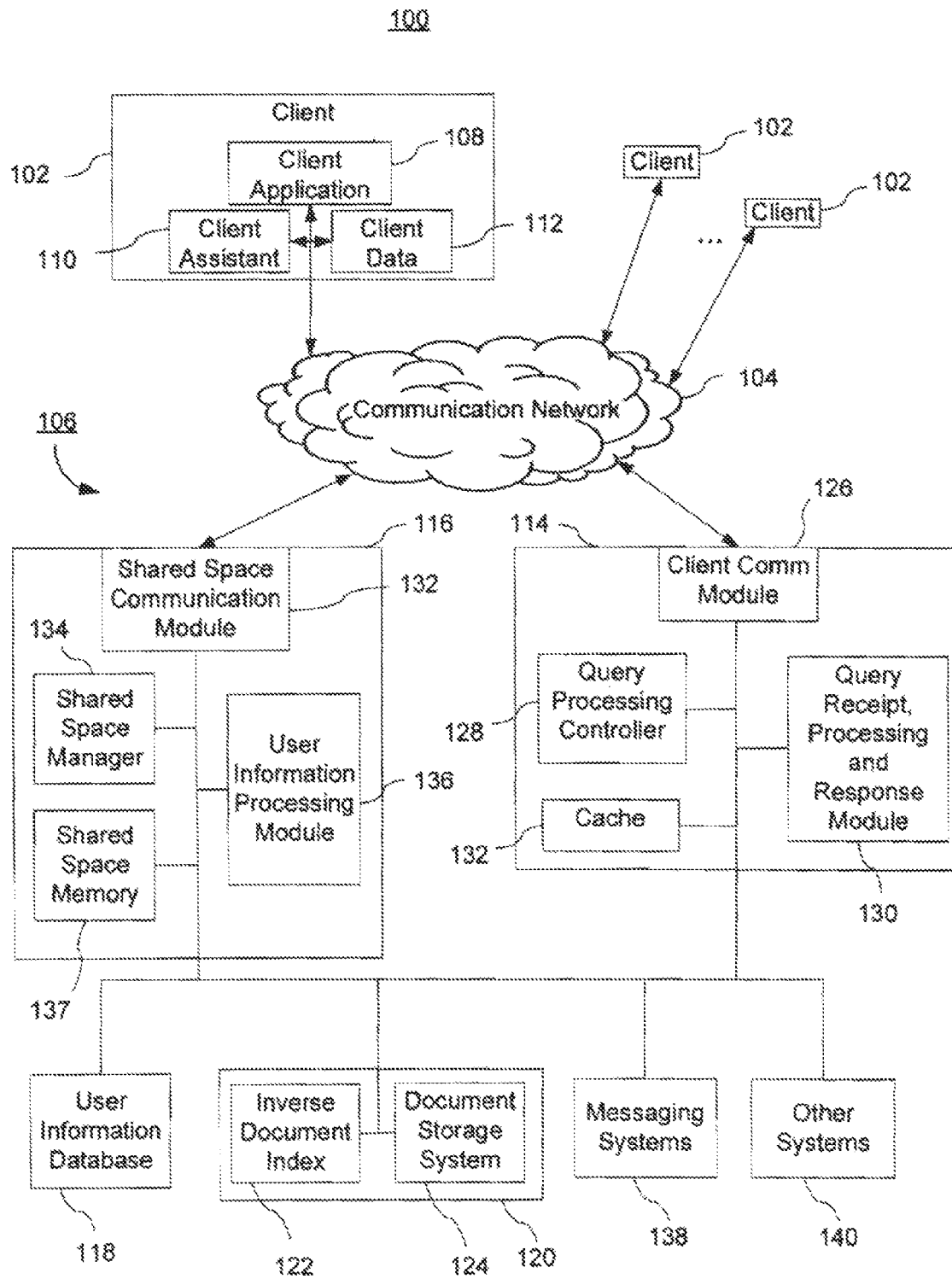
FIG. 1 depicts an environment in which embodiments of the invention can operate.

FIG. 1 illustrates an exemplary environment 100 in which some embodiments of the invention may operate. The environment 100 includes one or more clients 102, a communication network 104, and an information system 106. The client 102 can be any of a number of devices (e.g., a computer, an internet kiosk, a personal digital assistant, a cell phone, a gaming device, a desktop computer, or a laptop computer) and can include one or more client applications 108, a client assistant 110, and/or a client memory 112. The client application 108 can be a software application that permits a user to interact with the client 102 and/or network resources to perform one or more tasks. For example, the client application 108 can be a browser (e.g., Firefox) or other type of application that permits a user to search for, browse for, and/or use resources (e.g., web pages and web services) on the client 102 and/or accessible via the communication network 104. The client application 108 can also be a general purpose software application permitting the user to do various tasks on the client 102 (e.g., composing and editing documents). The client application 108 can be other types of general purpose software applications (e.g., a game). The client assistant 110 can perform one or more tasks related to monitoring a user's activities with respect to the client application 108 and/or other applications, searching or browsing for resources (e.g., files) on the client 102, and processing information received from or being sent to an information system 106. The client assistant 110 can be part of the client application 108, available as a plug-in to the client application 108 (provided, for example, from various on- line sources), or provided as a stand-alone program. The client memory 112 can store various types of information including, but not limited to, system information and information about a user.

The communication network 104 can be any local area network (LAN) and/or wide area network (WAN), such as an intranet, an extranet, or the Internet. It is sufficient that the communication network 104 provide communication capability between a client 102 and an information system 106. In some embodiments, the communication network 104 can transport information using the HyperText Transport Protocol (HTTP) via the Transmission Control Protocol/Internet Protocol (TCP/IP). HTTP permits client computers to access various resources on a client 102 and/or available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a web page, a document, a database, an image, or a computational object.

The information system 106 can include a search system 114 for receiving and responding to user search requests and a shared space system 116 for managing shared spaces. The information system 106 can also include a user information database 118, a document system 120, one or more messaging systems 138, and one or more other systems 140, all connected to the search system 114 and the shared space system 116. In some embodiments, one or more of the connections to the search system 114 and the shared space system 116 are made via the communication network 104. The user information database 118 can store one or more user profiles. A user profile can contain information about a user such as the user's preferences with respect to certain types or categories of information and/or terms. Alternatively, or in addition to, a user profile can be stored in a cookie stored on a user's computer (e.g., client 102). A cookie stored on a client 102 can typically comprise one or more name/value pairs and convey information about the state of a web browsing session. The cookie can be provided to the information system 106 as part of a search request or other communication. User profiles can be created in a variety of ways, such as by receiving information from a user and/or by inferring information about a user from the user's computing activities such as browsing, searching, messaging, and use of various software applications (e.g., a word processing application). The document system 120 can include an inverse document index 122 and a document storage system 124.

The index 334 and document database 336 are sometimes collectively called the document database. In some embodiments, "searching the document database" means searching the inverse document index 334 to identify document identifier of documents whose contents are relevant a specified search query or term. The documents corresponding to the document identifiers can be obtained fowl the document storage system 124. The document storage system 124 can also provide a snippet of a document based on various criteria (e.g., a portion of the document particularly relevant to a search query).

The search system 114 can be used as a search engine for locating resources located on hosts within an intranet, an extranet, and/or the Internet. The search system 114 can include a client communication module 126, a query processing controller 128, a query receipt, processing, and response module 130 and a cache 132. The client communication module 126 can provide for communications between the search system 114 and a client 102. Search queries submitted to the search system 114 by users at one of the clients 102 can be received at the query receipt, processing and response module 130. The queries are forwarded to the query processing controller 128, which manages interactions with the document system 120 to search for documents relevant to the search query. The document system 120 can return a list of documents relevant to the search query as the search results. The query processing controller can request snippets from one or more of the search results. In some instances, one or more of the search results are available from the cache 132. The query receipt, processing and response module 130 can receive information in the form of search results with or without snippets, and format the information to create a response for user submitting the search request.

The shared space system 116 can include a shared space communication module 132, a shared space manager 134, a user information processing module 136, and a shared space memory 137. The shared space communication module 136 can provide for communications between a client 102 and the shared space system 116. The shared space manager 134 can be used to create and maintain one or more shared spaces in accordance with shared space settings. The user information processing module 136 can be used to store and retrieve information from the user information database 118. The shared space memory 137 can store information relating to one or more shared spaces and system information.

The messaging systems 138 can provide for messaging between users and various network entities. For example, the messaging systems 138 can include an electronic message subsystem (e.g., email) and/or an instant message subsystem. The other systems 140 can provide for other network based systems such as web services, file management, image management, product reviews, on-line commerce sites and so on. One or more of the messaging systems 138 and/or other systems 140 optionally can be connected to the communication network directly 104.

Figure 2:
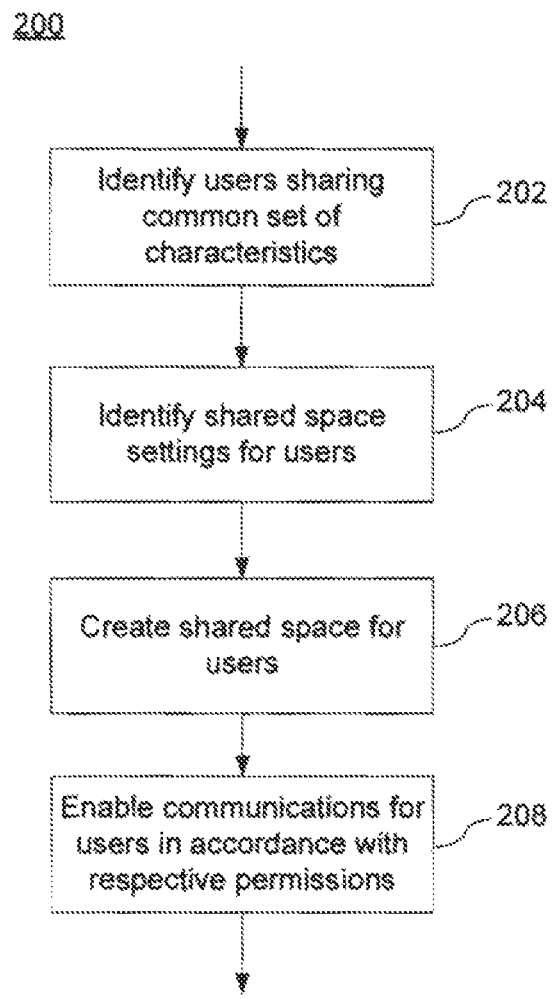
FIG. 2 is a flow chart of a process for dynamically generating a shared space in accordance with some embodiments of the present invention.

FIG. 2 illustrates one exemplary process 200 for creating and enabling shared communication spaces according to some embodiments of the invention. A plurality of users can be identified that share a common set of characteristics (202). As used in this specification, the term "user" refers to various types of entities such as users of client 102 and/or network or server agents. An agent can be an autonomous or semi-autonomous software application that produces and/or consumes information (e.g., a software application that provides information to consumers such as stock prices weather reports). An agent can be located on a client 102 and/or client or server in the network. Although the following discussion uses the term "user" for simplicity, it should be understood that the techniques described apply equally well to agents, as well as other type of network entities.

Users can be identified as sharing a common set of characteristics in a number of ways. For example, users can be identified as sharing a common set of characteristics when they are performing the same or related activities, either directly or indirectly. In some embodiments, the identification is bounded by a time period (e.g., 15 minutes) within which the same or related activities are being performed by the users. The activities can include, for example: submitting the same or related queries to a search system (such as search system 114), browsing and/or searching for information relating to the same or related topics (e.g., topics such as those found in the Open Directory Project), shopping on-line for the same or related items and/or services, browsing within a group of related sites (e.g., sites associated with a directory structure such as the Open Directory Project), browsing the same or related content, and playing the same or a related electronic game. A user's browsing of content can include, but is not limited to, browsing content on a web page, web site, or other any source of content. In some embodiments, a user's activities can be further characterized by identifying that the user is performing one or more activities associated with a particular locality (e.g., a user seeks to purchase an item within a defined geographical area). The activities can include composing, reading or otherwise accessing documents and/or services related to a same or similar topic, messaging to other users on the same or related topic (e.g., emailing to or instant messaging with another user a message whose contents is similar and/or related to a particular topic). In some embodiments, it is sufficient that the users are involved in an activity where a user's computing experience may be supplemented by communicating with other users doing the same or a similar activity.

In some embodiments, mutually identified characteristics can be used to identify users. For example users sharing one or more common interests and/or characteristics (e.g., as might be found in a user profile) can be determined. The interests can include, for example, an identification that the user is interested in one or more topics (such as those found in the Open Directory Project). A user can identify interests and a user's preference toward one or more topics. Certain interests of the user can be inferred from a user's actions. The characteristics of a user can include, for example, age, gender, and geographic location. A user's membership in a group can be used to identify that user with the other members in the group.

The activities a user is performing can be determined in a number of ways. For example, a client assistant 110 can monitor a user's activities with respect to one or more applications, such as a client application 108, and provide information about the user's activities to an information system 106. In another example, an information item (such as a cookie) that is provided along with a search or a resource request to a system (e.g., to the information system 106) can contain a user identifier that can be used to associate the user with the search or request. In yet another example, a user can be logged in to a service (e.g., an instant messaging service or web service) and the service can provide information about the user's activities.

The shared space manager 134 can obtain and/or receive information from various sources (e.g., a client assistant 110) about the activities of various users and determine which users, if any, are sharing a common set of characteristics such as performing the same or similar activities. The various sources from which the shared space manager can obtain and/or receive information can include, but is not limited to, for example, the client 102, the search system 114, the messaging systems 138 and the other systems 140. The shared space manager 134 can obtain and/or receive information with respect to interests shared by a plurality of users (e.g., by querying the user information database 118) to identify those users which share common interests. In some embodiments, the various sources can communicate to the shared space manager 134 an on-line status of the user (e.g., active, inactive, away, or busy).

For the plurality of identified users at 202, shared space settings can be determined for the users. The shared space settings for a user can describe a user's desired communications to and from the shared space with varying degrees of granularity. A user can define (by permitting or prohibiting) what types of information can be received, what types of filtering should be applied to the received information, from which sources information may be received, and to which receivers the user's information can be provided.

The types of information (sometimes referred to in this specification as "information items") which can be permitted or restricted can fall into two general areas: static information and streaming information. Additionally, archived information of those types can be included, as well as group editing of any of the types.

Static information can include, but it not limited to: text, advertisements, images, news items, map links, product reviews, phone numbers, e-mails, e-mail addresses, web page links, dictionary entries, syndication feeds, blog (web log) events, user polls, search queries, result selections from search results, advertisement selections, and links to files or other content on the client 102. Syndication feeds can provide content distributed from various sources on a network (e.g., the Internet). Typically, syndication can be used for distributing various types of content to a number of receivers simultaneously (e.g., stock prices and weather reports). News items can be news items from one or more sources. Blog events can be events generated from one or more web logs (blogs). User polls can be polls that the user may participate in which may come from a variety of sources. Streaming information can include, but is not limited to: audio, video, chatroom participation, instant messaging, and computer control such as browsing, navigation, mouse location, keyboard events, and screen contents.

A filter can provide a user with a means to restrict certain content based on various criteria (e.g., filtering out adult content). Filters can be user-created or system- provided. A user-created filter can be based on arbitrary criteria (e.g., specific word or word phrases).

A user can describe in the user's shared space settings from which sources information items can be received. A user can, for example, restrict and/or permit information items from an arbitrary set of sources and/or a set based on an arbitrary set of attributes associated with sources (e.g., restricting information originating from sources in the ".prof" top level domain). Similarly, a user can describe in the shared space settings to which receivers the user's information items can be sent. A user can, for example, restrict and/or permit receivers from receiving all or part of the user's information items to an arbitrary set of receivers and/or to a set of receivers based on an arbitrary set of attributes associated with receiver (e.g., permitting information to be provided to users who have a Google Gmail account).

A user's shared space settings can be stored in the user information database 118 and/or the client memory 112. A user's shared space settings can be established during a prior set up session for the user and/or during a transaction as part of an invitation transaction for inviting a user to participate in a shared space (described below). A user can modify the shared space settings at other times. In some embodiments, a user can have different shared space settings for each shared space in which the user is a participant. A user can create default shared space settings that can be applied to new shared spaces to which the user is invited and/or reset shared space settings for one or more current shared spaces to a default state. A system default shared space setting can be established for one or more users. In some embodiments, a user can be permitted to control the sharing of an information item on a per information item basis as that information is about to be shared.

A set of system settings can be created that can apply to one or more shared spaces. The system setting can include constraint or permissions with respect to: certain users; transmissions to a set for receivers larger than a particular size (e.g., as might be done to minimize spam); sending or receiving information based on arbitrary attributes of the information item's content (e.g., a filter); and arbitrary restrictions placed by the users to whom the space has been allocated (e.g., by settings modifiable within the shared space itself). The system settings can be stored in the shared space manager 134.

Referring back to FIG. 2, a shared space can be created (206). A shared space can take a variety of forms. For example, a shared space can be a chatroom, a pop-up window, a separate application window, a shared white board, a web page, or a combination thereof. It is sufficient that the shared space facilitate a one-way and/or two-way exchange of information items among users. The information items displayed in the shared space can include information items relevant to the common set of characteristics and/or information items provided by or selected by users, and other information items. The contents of a shared site can depend on the common set of characteristics. For example, a shared space where the common set of characteristics involves searching for a particular shopping item (e.g., a bicycle), can include for example, a chat space, searches performed by one or more of the users, results from one or more searches for the item, product reviews of the item, links to on-line auctions for the item, links to information on a network (e.g., the Internet or otherwise) relating to the item, advertisements relating to the item, and/or other resources relating to shopping for the item. In another example, a shared space where the common set of characteristics involves searching for information about a particular public company can include links to the company web site, links to on-line articles or news items relating to the company, one or more pieces of information relating to the company's stock price (e.g., a chart), links to the company governmental filings, and so on. Information relating to a shared space can be stored in the shared space memory 137. In some embodiments, one or more user can edit the types of information items displayed in the shared space (e.g., adding news feeds or product reviews).

Once a shared space is created, communications can be enabled for users in accordance with their respective shared space settings and any system settings (208). Users, for example, can be provided an invitation to join a shared space. The invitation can include a link to the shared space and/or instructions for connecting to the shared space. The invitation can include options for the user to create the user's shared space settings with respect to that shared space. The user can have an option to use a default setting. The default setting can be a user's default setting or a system-supplied default setting. As an example of settings, a user can choose to have revealed or to not have revealed the user's email address within the shared space and/or to the other users of the shared space. In another example, a user can choose to receive no advertisements as part the user's participation in particular shared space. Another user, however, can elect to receive advertisements for that same shared space. Accordingly, users may participate and receive information in accordance with their own shared space settings. The display on the client 102 of the shared space can therefore vary from user to user.

Figure 3:
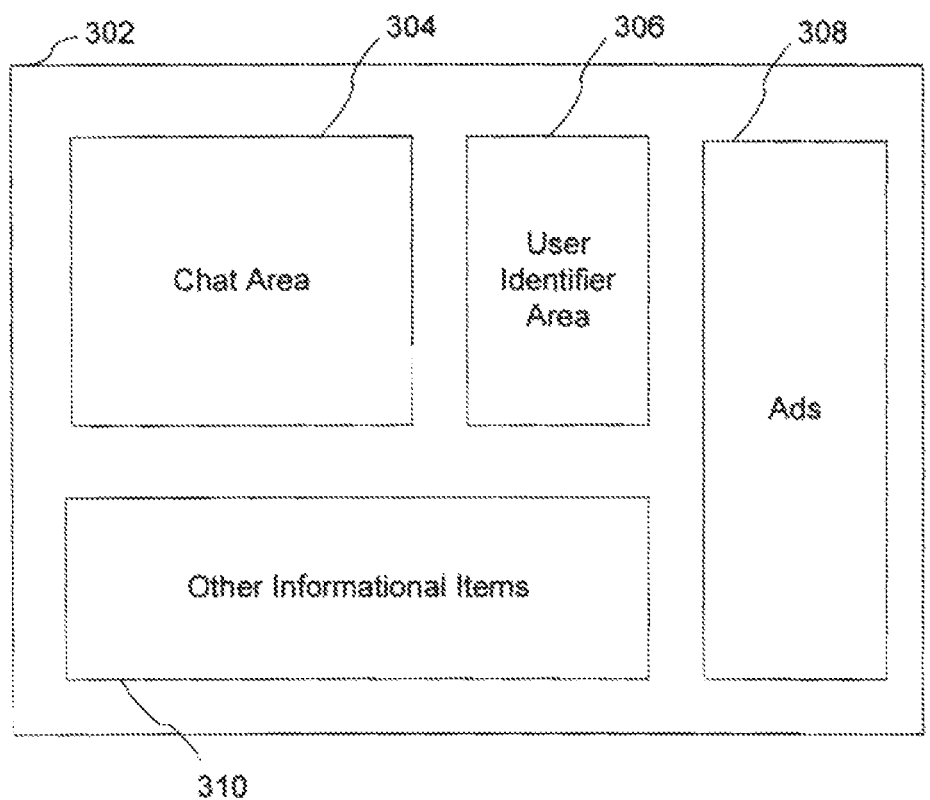
FIG. 3 depicts an exemplary screenshot of a shared space in accordance with some embodiments of the present invention.

FIG. 3 illustrates an exemplary screenshot of a shared space. A shared space window 302 includes a chat area 304, a user identifier area 306, an advertisements area 308 and other information items area 310. The chat area 304 can enable users to communicate with each other via text messages in real time. The user identifier area 306 can include identifiers for the user of the shared space. The information presented about a user, however, can be governed according to the user's shared space settings (e.g., a user may not desire to have his or her email revealed to the other users). The advertisements area 308 can include one or more advertisements relating to the common characteristics of the shared space. In some embodiments, the advertisements can change based on the contents of one or more of the information items being displayed in the window 302. The other information items area 310 can contain one or more information items as described above (e.g., product reviews). Of course, shared space window 302 is merely exemplary and a shared space may contain fewer, more, and/or different areas.

Figure 4:
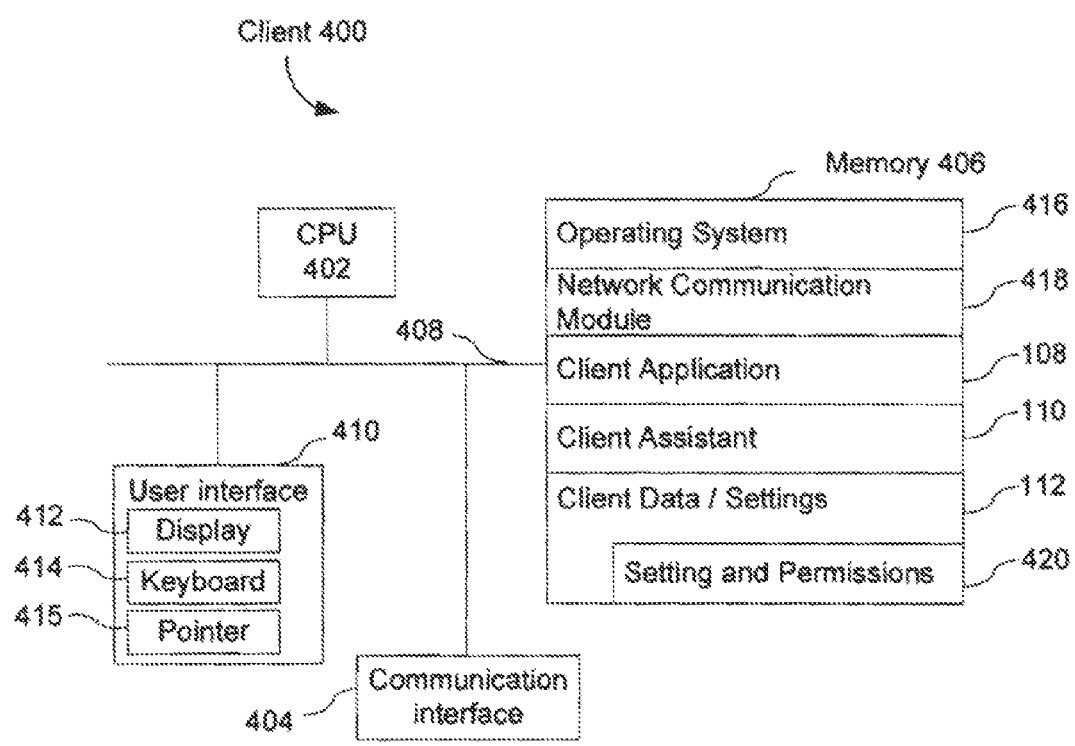
FIG. 4 is a block diagram of an exemplary client in accordance with some embodiments of the invention.

FIG. 4 is a block diagram of a client 400. The client 400 generally includes one or more processing units (CPUs) 402, one or more network or other communications interfaces 404, memory 406, and one or more communication buses 408 for interconnecting these components. The client 400 may optionally include a user interface 410, for instance a display 412 and a keyboard 414. Memory 406 may include high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. In some embodiments, the memory 406 stores the following programs, modules and data structures, or a subset thereof:

an operating system 416 that includes procedures for handling various basic system services and for performing hardware dependent tasks;

a network communication module (or instructions) 418 that is used for connecting the client 400 other computers via the one or more communication network interfaces 404 (wired or wireless), such as the Internet, other wide area networks, local area networks, metropolitan area networks, and so on;

a client application 108 as described above;

a client assistant 110 as described above; and a client memory 112 that can include a user's settings and permissions 420.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Figure 5:
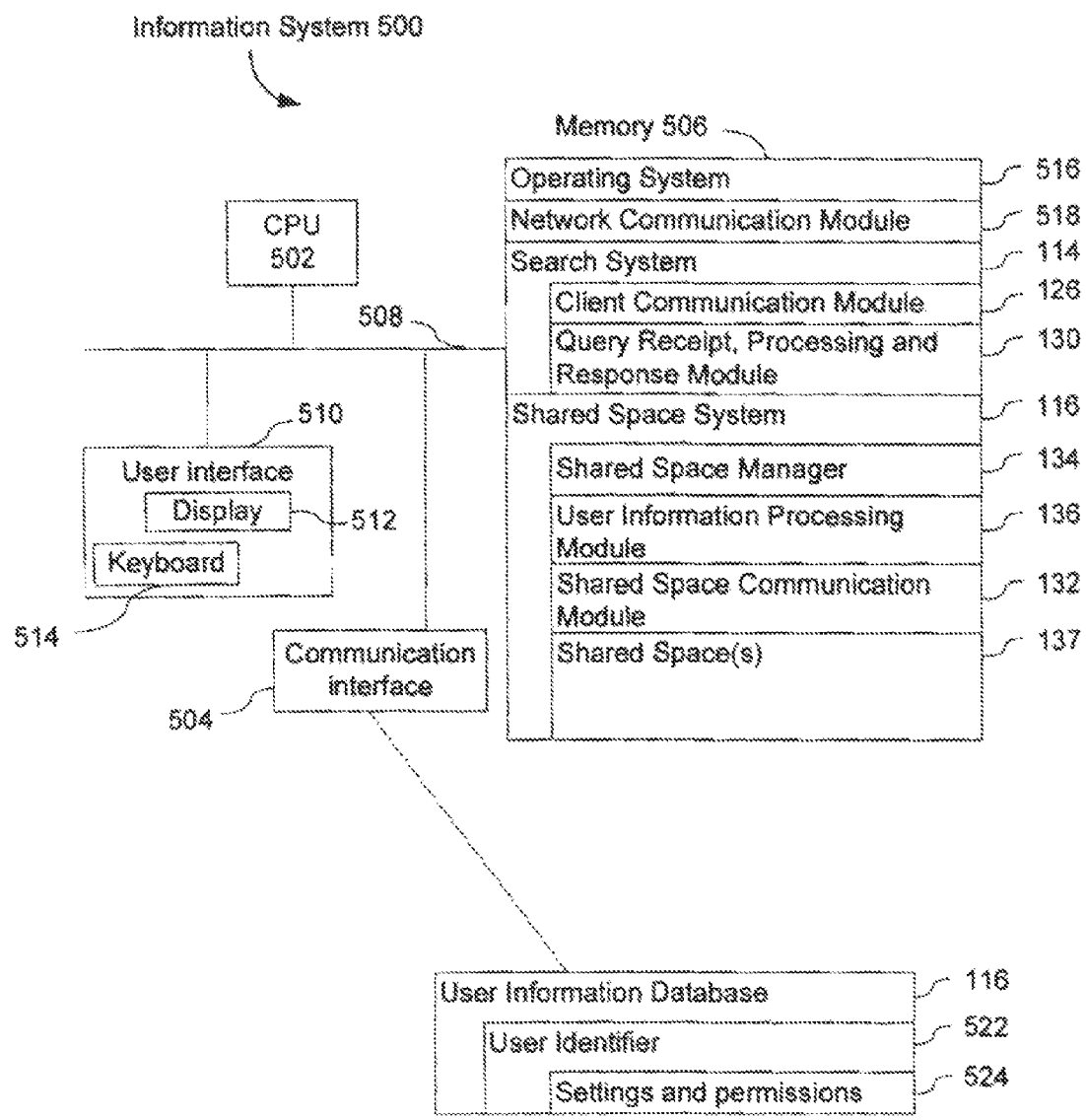
FIG. 5 is a block diagram of an exemplary information system in accordance with some embodiments of the invention.

FIG. 5 is a block diagram of an information system 500. The information system 500 generally includes one or more processing units (CPUs) 502, one or more network or other communications interfaces 504, memory 506, and one or more communication buses 508 for interconnecting these components. The information system 500 may optionally include a user interface 510, for instance a display 512 and a keyboard 514. Memory 506 may include high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. In some embodiments, the memory 506 stores the following programs, modules and data structures, or a subset thereof:

an operating system 516 that includes procedures for handling various basic system services and for performing hardware dependent tasks;

a network communication module (or instructions) 518 that is used for connecting the information system 500 to other computers via the one or more communication network interfaces 504 (wired or wireless), such as the Internet, other wide area networks, local area networks, metropolitan area networks, and so on;

a search system 114, including a client communication module (or instructions) 126 for communicating with the clients 102 and a query receipt, processing, and response module (or instructions) 130 for receiving and processing search requests from clients 102; and a shared space system 116, including a shared space manager 134 as described above, a user information processing module (or instructions) 136 as described above, a shared space communications module (or instructions) 132 as described, and a shared space memory 137 including one or more shared spaces 520.

The shared spaces 520 can include, for example, information relating to the shared space such as formatting and display information, a list of users and associated communications settings, and lists of information items which can be displayed in the shared space.

The information system 500 can be connected to the user information database. The user information database 116 can include information about one or more users. A user identifier 522 can be associated with settings and permissions 524, which can define the setting and permissions (as described above) for the user corresponding to the user identifier 522. Ad server 128 can contain one or more advertisements 1020. The ad server 128 can receive input and return advertisements that are relevant to the input. The information item server 130 can include one or more information items 1022. Similar to the ad server 128, the information server 130 can receive input and return information items that are relevant to the input.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

FIGS. 4 and 5 are intended more as functional descriptions of the various features which may be present in one or more servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement an information system how features are allocated among them will vary from one implementation to another, and may depend in part on the amount of data traffic that the system must handle during peak usage periods as well as during average usage periods.

Although one or more of the drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for providing communications, the method comprising:

identifying, by at least one of one or more processors, a set of users that share a common set of characteristics by determining an online status of each user in the set of users and determining that the set of users perform same or related activities within a bounded time period and a defined geographical area;

dynamically creating, by at least one of the one or more processors, a shared communication space for the set of users;

creating, by at least one of the one or more processors, shared space settings for a first user in the shared communication space, wherein the shared space settings define what communications to and from the shared communication space are permitted or prohibited for the first user, and control, on a per information item basis, what information items can be shared;

sending to the first user an invitation that invites the first user to join the shared communication space, the invitation including the shared space settings specifying on a per information item basis what can be shared by the first user; and in response to the first user joining the shared communication space based on the invitation:

applying the shared space settings of the first user to the shared communication space;

filtering, by at least one of the one or more processors, information items provided to the first user based on the shared space settings associated with the first user including identifying a set of receivers of an information item in the shared communication space, the set of receivers including the first user, and determining whether to send the information item to the first user based on determining whether a number of receivers in the set is larger than a particular size;

outputting the filtered information items and instructions that cause display of a user interface including the filtered information items when the instructions are executed on a client device; and receiving the communications from other users of the set of users about the filtered information items in the shared communications space.

2. The method of claim 1, wherein performing the same or related activities comprises at least one of messaging on similar topics, composing documents related to similar information, playing related games, shopping online for same or related items or services and browsing within a group of related sites.

3. The method of claim 1, wherein the set of users includes users of clients, and wherein the clients include at least one of a mobile phone and a gaming device.

4. The method of claim 1, further comprising determining user interests, and wherein identifying the set of users that share the common set of characteristics comprises identifying the set of users that share common user interests.

5. The method of claim 4, wherein the user interests are determined based on information in a user profile associated with the first user or are inferred from activities associated with the first user.

6. The method of claim 1, wherein outputting the filtered information items further comprises:

determining a first information item based on the shared space settings associated with the first user;

displaying the first information item in a first portion of the shared communication space;

determining a second information item based on the first information item; and displaying the second information item in a second portion of the shared communication space.

7. The method of claim 1, wherein the information items include information items related to the common set of characteristics.

8. The method of claim 1, wherein the information items include information items provided by or selected by the set of users.

9. The method of claim 1, wherein the information items include information items generated based on a user profile associated with the first user.

10. A system for providing communications, the system comprising:
  one or more processors;
  memory storing at least one program for execution by the one or more processors, the at least one program including instructions for:
    identifying a set of users that share a common set of characteristics by determining an online status of each user in the set of users and determining that the set of users perform same or related activities within a bounded time period and a defined geographical area;
    dynamically creating a shared communication space for the set of users;
    creating shared space settings for a first user in the shared communication space wherein the shared space settings define what communications to and from the shared communication space are permitted or prohibited for the first user, and control, on a per information item basis, what information items can be shared;
    sending to the first user an invitation that invites the first user to join the shared communication space, the invitation including the shared space settings specifying on a per information item basis what can be shared by the first user; and
    in response to the first user joining the shared communication space based on the invitation:
      applying the shared space settings of the first user to the shared communication space;
      filtering information items provided to the first user based on the shared space settings associated with the first user including identifying a set of receivers of an information item in the shared communication space, the set of receivers including the first user, and determining whether to send the information item to the first user based on determining whether a number of receivers in the set is larger than a particular size;
      outputting the filtered information items and instructions that cause display of a user interface including the filtered information items when the instructions are executed on a client device; and
      receiving the communications from other users of the set of users about the filtered information items in the shared communications space.

11. The system of claim 10, wherein performing the same or related activities comprises at least one of messaging on similar topics, composing documents related to similar information, playing related games, shopping online for same or related items or services and browsing within a group of related sites.

12. The system of claim 10, wherein the set of users includes users of clients, and wherein the clients include at least one of a mobile phone and a gaming device.

13. The system of claim 10, wherein the at least one program further comprises instructions for determining user interests, and wherein identifying the set of users that share the common set of characteristics comprises identifying the set of users that share common user interests.

14. The system of claim 13, wherein the user interests are determined based on information in a user profile associated with the first user or are inferred from activities associated with the first user.

15. The system of claim 10, wherein the information items include information items generated based on a user profile associated with the first user.

16. A computer program product comprising a non-transitory computer useable medium including a computer readable program, wherein the computer readable program when executed on a computer causes the computer to:
  identify a set of users that share a common set of characteristics by determining an online status of each user in the set of users and determining that the set of users perform same or related activities within a bounded time period and a defined geographical area;
  dynamically create a shared communication space for the set of users;
  create shared space settings for a first user in the shared communication space, wherein the shared space settings define what communications to and from the shared communication space are permitted or prohibited for the first user, and control, on a per information item basis, what information items can be shared;
  send to the first user an invitation that invites the first user to join the shared communication space, the invitation including the shared space settings specifying on a per information item basis what can be shared by the first user; and
  in response to the first user joining the shared communication space based on the invitation:
    apply the shared space settings of the first user to the shared communication space;
    filter information items provided to the first user based on the shared space settings associated with the first user including identifying a set of receivers of an information item in the shared communication space, the set of receivers including the first user, and determining whether to send the information item to the first user based on determining whether a number of receivers in the set is larger than a particular size;
    output the filtered information items and instructions that cause display of a user interface including the filtered information items when the instructions are executed on a client device; and
    receive communications from other users of the set of users about the filtered information items in the shared communications space.

17. The computer program product of claim 16, wherein performing the same or related activities comprises at least one of messaging on similar topics, composing documents related to similar information, playing related games, shopping online for same or related items or services and browsing within a group of related sites.

18. The computer program product of claim 16, wherein the set of users includes users of clients, and wherein the clients include at least one of a mobile phone and a gaming device.

19. The computer program product of claim 16, wherein the computer readable program when executed on the computer further causes the computer to determine user interests, and wherein identifying the set of users that share the common set of characteristics comprises identifying the set of users that share common user interests.

20. The computer program product of claim 19, wherein the user interests are determined based on information in a user profile associated with the first user or are inferred from activities associated with the first user.

* * * * *